(12) United States Patent
Mai et al.

(10) Patent No.: US 9,946,694 B2
(45) Date of Patent: Apr. 17, 2018

(54) METHODS, SYSTEMS AND APPARATUSES FOR SCALABLE ELECTRONIC DATA INTERCHANGE COMMUNICATIONS WITH SMART WEB FORMS

(71) Applicant: DiCentral Corporation, Houston, TX (US)

(72) Inventors: Thuy Quang Mai, Houston, TX (US); Binh Quang Mai, Dickinson, TX (US); Hung Van Pham, Houston, TX (US)

(73) Assignee: DiCentral Corporation, Houston, TX (US)

(*) Notice: Subject to any disclaimer, the term of this patent is extended or adjusted under 35 U.S.C. 154(b) by 224 days.

(21) Appl. No.: 13/675,891

(22) Filed: Nov. 13, 2012

(65) Prior Publication Data

US 2014/0136961 A1    May 15, 2014

(51) Int. Cl.
*G06F 17/22* (2006.01)
*G06F 15/163* (2006.01)

(52) U.S. Cl.
CPC ................................. *G06F 17/2264* (2013.01)

(58) Field of Classification Search
CPC ........... G06F 17/30879; G06F 17/2264; G06F 15/163; G06F 17/60; G06Q 30/02; G06Q 30/0641; G06Q 30/0623; G06Q 30/0227
USPC .................. 715/249; 705/26.1, 26.61, 26.62; 709/203, 219
See application file for complete search history.

(56) References Cited

U.S. PATENT DOCUMENTS 5,794,234 A * 8/1998 Church et al.
5,893,076 A    4/1999 Hafner et al.
6,625,581 B1 * 9/2003 Perkowski .................... 705/27.1
7,171,379 B2   1/2007 Menninger et al.
7,257,647 B2   8/2007 Katz et al.
7,908,398 B2 * 3/2011 Grow ................ G06F 17/30569
                                                    709/201

(Continued)

FOREIGN PATENT DOCUMENTS

WO    WO0173650 A1    10/2001

OTHER PUBLICATIONS

Copeland et al. (https://www.isoc.org/inet97/proceedings/C5/C5 1.HTM) published 1997.*

(Continued)

*Primary Examiner* — Cesar Paula
*Assistant Examiner* — Jian Huang
(74) *Attorney, Agent, or Firm* — Hirsch & Westheimer, PC

(57) ABSTRACT

Methods, systems, and apparatuses are disclosed for a computer-implemented method for facilitating electronic data interchange ("EDI") communication. An EDI document from a first trading partner is in a first format, with data in a plurality of fields. The fields are mapped to fields of an EDI standard. The data in the mapped fields are translated to an intermediate format to create an intermediate format file. Rules, which may be customized, may be applied to the intermediate format file. The rules may include business rules customized for the first trading partner, math rules and/or logic rules. The intermediate format file may be verified to determine whether it complies with the EDI standard and/or the business rules of the first trading partner. The data from the intermediate format to a second format compatible with a computer system of a second trading partner, to create a second format file.

33 Claims, 11 Drawing Sheets

(56) References Cited

U.S. PATENT DOCUMENTS

| | | | |
|---|---|---|---|
| 8,458,582 B2 | 6/2013 | Rogers et al. | |
| 2002/0040359 A1 | 4/2002 | Green et al. | |
| 2002/0099735 A1 | 7/2002 | Schroeder et al. | |
| 2002/0184170 A1 | 12/2002 | Gilbert et al. | |
| 2003/0065623 A1* | 4/2003 | Corneil et al. | 705/64 |
| 2004/0153378 A1* | 8/2004 | Perkowski | 705/27 |
| 2006/0258421 A1* | 11/2006 | Nicholas | A63F 13/12 463/4 |
| 2008/0270977 A1 | 10/2008 | Nucci et al. | |
| 2009/0198520 A1* | 8/2009 | Piovanetti-Perez | 705/3 |

OTHER PUBLICATIONS

Reimers (Electronic Markets, 2001, vol. 11(4) 231-237).*
McZeal, "File Bankruptcy Online", published online, on Nov. 25, 2009, at http://www.filebankruptcyonline.com/.*
cXML User's Guide, version 1.2.009, Jun. 2003, 272 pages, United States.
Dave Berry, Clemens Utschig, Demed L'Her, "Enterprise Services Buses: Where are they going?" (Oracle White Paper), Oct. 2006, 10 pages, Oracle Corporation, Redwood Shores, CA.
Mike Somekh, Mark Foster, Rastislav Kanocz, "Glassfish™ Enterprise Service Bus (ESB) High Availability and Clustering" (White Paper), Dec. 2009, 38 pages, Sun Microsystems, Inc, Santa Clara, CA.
Meeraj Kinnumpurath, "JBI—A Standard-based approach for SOA in Java," Dec. 2005, 5 pages, [online] [retrieved on Apr. 30, 2015] Retrieved from the Internet: <URL: http://www.theserverside.com/news/1364378/JBI-A-Standard-based-approach-for-SOA-in-Java>.

* cited by examiner

Store (810) Invoice — Version No: 6.0.95

File  Edit  Help  Accounting Tools

[Send]  [Drafts]

\* = Required field

- *Invoice Date — 610
- *Terms Type — 615
- Disc Percent — 620
- Disc Due Date — 625
- Disc Days Due — 630
- Disc Amount  0.00 — 635
- *Net Days — 640

*Invoice No
*Ship To Name
*Ship To ID Type  Duns No + DC No
*Ship To Code
*Ship To Addr
*City State Zip

*PO Date
*PO No
*Remit To ID Type  Duns No
*Remit To Code

Duns No: 014578892

| ID | *Qty Invoiced | *Unit Type | *Unit Price | Basis Unit Price | *Product Type | *Product ID |
|---|---|---|---|---|---|---|
| ▲ 0 | 1 | Each | | Per Each | | |

Allow Type — Allow Amt — Net Amt Due  0.00

Charge Type — Charge Amt — *No of Ln Items  1

ButtonDlg

|   | A | B | C | D |
|---|---|---|---|---|
| 1 | Quantity In... | Assigned I... | | |
| 2 | | | | |
| 3 | | | | |
| 4 | | | | |
| 5 | | | | |

Business Rules — 710

If  `B1 == S1` then  `A1` else  `null`

Cancel

OK

FIG. 8 col0Dlg

Enter sum2 formula for Grid table.

`col1 * col3 - col10`   Clear

LineItem Formula

`col1 * col3 - col10`  — 820   Clear

[3 ▼]    3: No RoundOff
         2: Two Digits RoundOff
810      1: Truncate 2 digits
         0: Truncate 3 digits Cancel   OK

150

METHODS, SYSTEMS AND APPARATUSES FOR SCALABLE ELECTRONIC DATA INTERCHANGE COMMUNICATIONS WITH SMART WEB FORMS

TECHNICAL FIELD OF THE INVENTION

The present disclosure relates generally to methods, systems, and apparatuses for use in electronic document exchanges among computer systems. More particularly, the disclosure relates to systems, methods, and apparatuses for more effective and efficient performing and facilitating of electronic data interchange (EDI) communications.

BACKGROUND

Electronic data interchange (EDI) is a structured way of exchanging data electronically, directly between computer systems, according to particular standards. EDI standards set out the proper format, characters, and data elements to be used in EDI communication. There are several different standards currently being used throughout the world and others may be developed from time to time. EDI communications often occur between trading partners, such as individuals, businesses, government organizations, charities, and other organizations and entities which have a need to exchange data directly between computer systems. The relationship between trading partners may be that of buyer and seller, but may also be that of merchant and warehouse, merchant and shipper, supplier and third party supplier, collaborators of various sorts, or any other relationship for which the members find electronic transmission of data advantageous. EDI communications may also take place between computer systems owned by a single organization; that is, the EDI communications may include internal communications, as well as external communications.

While EDI communications are often used among businesses, EDI communications are not so limited. They may include, for example, scientific information, medical information, transportation information, engineering information, or any other communication where the exchange of data directly between computers is likely to be useful. The EDI transmission of the data commonly uses any convenient method and may include internet as well as non-internet transmission, either via hard wire or wireless methods.

Even using a common standard, implementation of EDI format differs among trading partners. While an invoice, for example, may contain several types of data as a minimum in order to comply with an EDI standard, the invoices of different entities may vary considerably according to their particular industry and needs. Thus, transmitting a first trading partner's EDI data to a second trading partner, and displaying the data correctly in the second trading partner's format, can be problematic.

In addition, while working out the difficulties of communication between just two trading partners might be a limited problem, large organizations may have not just one but dozens, hundreds, or even thousands of trading partners. And each of the dozens or hundreds of trading partners may themselves have one, two, dozens, hundreds, or thousands of trading partners. With each having slightly different arrangements of EDI documentation, EDI communication becomes more complex. The issue is also complex for using an EDI multi-tenant platform, which hosts and facilitates EDI communication among many trading partners.

One approach to this problem is described in the Wikipedia entry for "Electronic Data Interchange":

For an "inbound" document the EDI solution will receive the file (either via a Value Added Network or directly using protocols such as FTP or AS2), take the received EDI file (commonly referred to as a "mailbag"), validate that the trading partner who is sending the file is a valid trading partner, that the structure of the file meets the EDI standards and that the individual fields of information conforms to the agreed upon standards. Typically the translator will either create a file of either fixed length, variable length or XML tagged format or "print" the received EDI document (for non-integrated EDI environments). The next step is to convert/transform the file that the translator creates into a format that can be imported into a company's back-end business systems or ERP. This can be accomplished by using a custom program, an integrated proprietary "mapper" or to use integrated standards based graphical "mapper" using a standard data transformation language such as XSLT. The final step is to import the transformed file (or database) into the company's back-end enterprise resource planning (ERP) system.

For an "outbound" document the process for integrated EDI is to export a file (or read a database) from a company's back-end ERP, transform the file to the appropriate format for the translator. The translation software will then "validate" the EDI file sent to ensure that it meets the standard agreed upon by the trading partners, convert the file into "EDI" format (adding in the appropriate identifiers and control structures) and send the file to the trading partner (using the appropriate communications protocol).

In EDI terminology "inbound" and "outbound" refer to the direction of transmission of an EDI document in relation to a particular system, not the direction of merchandise, money or other things represented by the document. For example, an EDI document that tells a warehouse to perform an outbound shipment is an inbound document in relation to the warehouse computer system. It is an outbound document in relation to the manufacturer or dealer that transmitted the document."

But even using the approach disclosed above, for outgoing documents, the translator must understand what data to retrieve from locations within the database, or ERP file used by the transmitting trading partner, to transform it into a first EDI format used by the transmitting trading partner. For incoming documents, the translator must understand how to take incoming EDI data in the first EDI format used by the transmitting trading partner and convert it into a second EDI format used by a receiving trading partner. Both processes can be complex problems, requiring coding specific to the trading partner's format. If the translator retrieves data and formats it incorrectly, error can result.

As a part of or after translation from a first EDI format, many systems push the data into a database. When the data is translated into a second trading partner's version of EDI, the translator must know which data to retrieve from the database.

Alternatively, in some cases, such as with a first trading partner of significant size, the second trading partner will be forced to adopt the first trading partner's version of EDI, even if that version is a poor fit for the second trading partner's business.

SUMMARY

In view of the aforementioned problems and trends, embodiments of the present invention provide systems, methods and apparatuses for performing EDI communications.

The embodiments of the invention described herein include a computer-implemented method for facilitating electronic data interchange ("EDI"), including receiving an EDI document in a first format having data in a plurality of fields from a first computer system of a first trading partner. The computer-implemented method also includes the steps of facilitating mapping of the fields of the EDI document to a plurality of EDI standard fields of an EDI standard, translating the data in the mapped fields to an intermediate format, and translating the data from the intermediate format to a second format compatible with a second computer system of a second trading partner, to create a second format file.

Other embodiments of the invention described herein include an article of manufacture including a medium tangibly embodying a program of instructions that, if executed, enable a processor-based system to receive an EDI document in a first format, having data in a plurality of fields from a first trading partner. The program of instructions, if executed, also enable the processor-based system to facilitate mapping of the fields of the EDI document to a plurality of standard fields of an EDI standard, translate the data in the mapped fields to an intermediate format, and translate the data from the intermediate format to a second format that is compatible with a computer system of a second trading partner, to create a second format file.

Other embodiments of the invention described herein include an article of manufacture comprising a medium tangibly embodying a program of instructions that, if executed, enable a processor-based system to receive an EDI document in a first format, having data in a plurality of fields from a first trading partner. The program of instructions, if executed, also enable the processor-based system to facilitate mapping of the fields of the EDI document to a plurality of standard fields of an EDI standard, translate the data in the mapped fields to an intermediate format, and translate the data from the intermediate format to a second format compatible with a computer system of a second trading partner, to create a second format file.

Other embodiments of the invention described herein include an apparatus that includes a processor coupled to at least one bus and at least one memory, the processor configured to receive from a first computer system an EDI document in a first format and having a plurality of fields. The apparatus also includes a GUI having a drag and drop functionality, coupled to the processor and to an input device, and configured to allow a user to the input device to map a plurality of fields of the EDI document in a first format to standard fields of an EDI standard using the drag and drop functionality. The apparatus also includes a main translator coupled to the processor and coupled to the GUI, the main translator being configured to translate the data in the mapped fields of the EDI document to an intermediate format to create an intermediate file, and an EDI transformation component coupled to the main translator and configured to append at least one rules component to the data in the intermediate file. The apparatus further includes an EDI mini-translator engine coupled to the EDI transformation component and configured to translate the intermediate file to a secondary format to create a secondary format file.

Other embodiments of the invention described herein include a computing system responsive to input data, adapted for facilitating EDI communication including a processor coupled to memory and to a bus, configured to receive an EDI document in a first format from a first computer system and a GUI having a drag and drop functionality, coupled to the processor and to an input device, and configured to allow a user, acting through the input device, to map a plurality of fields of the EDI document in a first format to standard fields of an EDI standard using the drag and drop functionality. The computing system also includes a main translator coupled to the processor and coupled to the GUI. The main translator being configured to translate the data in the mapped fields of the EDI document to an intermediate format to create an intermediate file. The computing system also includes an EDI transformation component coupled to the main translator and configured to append at least a business rules component to the intermediate file, to determine whether the intermediate file complies with the business rule and to send an alert to the first computer system if the intermediate file does not comply with the business rule. The computing system also includes an EDI mini-translator engine for translating the intermediate file to a secondary format to create a secondary format file.

Other aspects of the embodiments described herein will become apparent from the following description and the accompanying drawings, illustrating the principles of the embodiments by way of example only.

BRIEF DESCRIPTION OF THE DRAWINGS

The following figures form part of the present specification and are included to further demonstrate certain aspects of the present claimed subject matter. The figures should not be used to limit or define the present claimed subject matter. The present claimed subject matter may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings, in which like reference numerals may identify like elements, wherein:

FIG. 3 illustrates a screen shot of a Graphical User Interface of an EDI facilitation device, in accordance with one or more embodiments of the present disclosure, depicting an invoice, having one or more invoice fields, of a first trading partner and a scrollable list of EDI X12 standard fields;

FIG. 6 illustrates a screen shot of a smart web form, in accordance with one or more embodiments of the present disclosure;

FIG. 7 illustrates a screen shot of a Graphical User Interface of an EDI facilitation device depicting the use of Logical Components, in accordance with one or more embodiments of the present disclosure;

FIG. 8 illustrates a screen shot of a Graphical User Interface of an EDI facilitation device depicting the use of Mathematical Components, in accordance with one or more embodiments of the present disclosure;

NOTATION AND NOMENCLATURE

Figure 1:
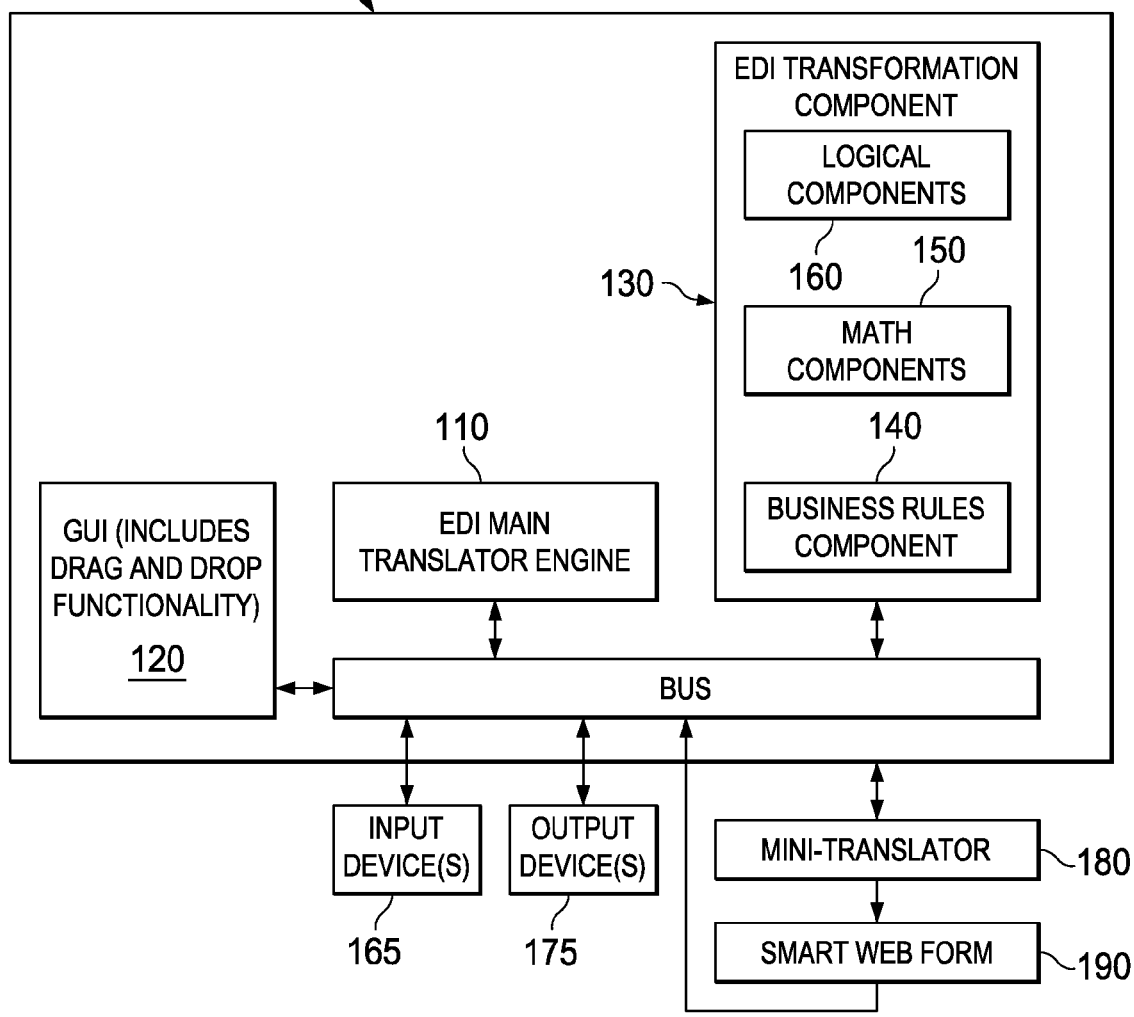
FIG. 1 depicts an EDI facilitation device and its components, in accordance with one or more embodiments of the present disclosure.

Certain terms are used throughout the following description and claims to refer to particular system components and configurations. As one skilled in the art will appreciate, the same component may be referred to by different names. This document does not intend to distinguish between components that differ in name but not function. In the following discussion and in the claims, the terms "including" and "comprising" are used in an open-ended fashion, and thus should be interpreted to mean "including, but not limited to . . . ." In addition, the term "couple" or "couples" is intended to mean either an indirect or a direct connection. Thus, if a first device couples to a second device, that connection may be through a direct connection, or through an indirect connection via other devices and connections. While the word "computer" and the phrase "computer systems" are used herein, this may not be limited to desktop and laptop computing systems. It may be possible to accomplish EDI communications between mobile devices of various sorts, such as mobile phones and other personal computer systems. If documents, data or information are "sent" or "received" between computers, the words include direct communication and indirect communication. This includes, without limitation, use of e-mail, a web-based server, instant messaging, or use of cloud computing.

DETAILED DESCRIPTION

The foregoing description of the figures is provided for the convenience of the reader. It should be understood, however, that the embodiments are not limited to the precise arrangements and configurations shown in the figures. Also, the figures are not necessarily drawn to scale, and certain features may be shown exaggerated in scale or in generalized or schematic form, in the interest of clarity and conciseness. The same or similar parts may be marked with the same or similar reference numerals.

While various embodiments are described herein, it should be appreciated that the present invention encompasses many inventive concepts that may be embodied in a wide variety of contexts. The following detailed description of exemplary embodiments, read in conjunction with the accompanying drawings, is merely illustrative and is not to be taken as limiting the scope of the invention, as it would be impossible or impractical to include all of the possible embodiments and contexts of the invention in this disclosure. Upon reading this disclosure, many alternative embodiments of the present invention will be apparent to persons of ordinary skill in the art. The scope of the invention is defined by the appended claims and equivalents thereof.

Illustrative embodiments of the invention are described below. In the interest of clarity, not all features of an actual implementation are described in this specification. In the development of any such actual embodiment, numerous implementation-specific decisions may need to be made to achieve the design-specific goals, which may vary from one implementation to another. It will be appreciated that such a development effort, while possibly complex and time-consuming, would nevertheless be a routine undertaking for persons of ordinary skill in the art having the benefit of this disclosure.

FIG. 1 depicts an EDI communication facilitation device 100 and its components in accordance with one or more embodiments of the present disclosure. The EDI communication facilitation device 100 may be stored in memory on a computer system (not depicted in FIG. 1). Components of the EDI communication facilitation device 100 may communicate via a bus 102. A document in a first EDI format of a first trading partner includes a plurality of fields, at least one of the fields containing data. The document is received by a Main Translator 110, depicted in FIG. 1. A Graphical User Interface 120 in communication with the Main Translator 110 facilitates user input to map the fields in the document in the first EDI format to standard fields in an EDI standard, such as the American National Standards Institute ("ANSI") Accredited Standards Committee ("ASC") X12 standard, as described further herein. (The process of mapping is further depicted in FIG. 3 through FIG. 5 and described further herein.) The Graphical User Interface 120 preferably provides a drag and drop functionality that facilitates the mapping process. The Main Translator 110 validates and translates the data in the fields mapped to the standard fields into an intermediate format, such as Gold Standard™ format by DICentral®, creating an intermediate format file. (The intermediate format file is not pictured in FIG. 1.) Mapping the fields in the document in the first EDI format to the standard fields in an EDI standard simplifies the translation process, because the Main Translator 110 may be programmed to take the data of each standard field and place it into its proper individual setting in the intermediate format. The translation may be accomplished in part by using tags. A tag is a code word used to represent a business rule or a syntax rule.

The intermediate format file is not a database and is preferably in a text format. The intermediate format may be considered an "EDI universal format"; that is, the intermediate format preferably has an individual setting for each possible piece of data that can be entered in the EDI standard.

Although the X12 standard is mentioned above, the intermediate standard may be designed to work with any EDI standard. As examples, a standard developed by the Organization for Tele Transmission in Europe ("ODETTE") is used for EDI communications for the European automotive industry. The United Nations/Electronic Data Interchange For Administration, Commerce And Transport ("UN/EDIFACT") standard is used for EDI communications internationally, and the Trading Data Communications Standard ("TRADACOMS") is used for EDI communications in the UK retail industry. One or more versions of the intermediate format could work with these standards. As new standards emerge, the intermediate format may be updated and/or modified to accommodate the new standards.

Preferably, the intermediate format also has settings for customizable information, such as business rules. Referring again to FIG. 1, the EDI Transformation Component 130, such as UniStudio™ by DICentral®, may apply customized business rules, as specified by the first trading partner, to the intermediate format file to create a customized intermediate format file, using a Business Rules Component 140. (The customized intermediate format file is not pictured in FIG. 1.) The Business Rules Component 140 allows the inclusion of a trading partner's business rules into the intermediate format file. If the Business Rules Component 140 detects non-compliance with a business rule, the Business Rules Component 140 can generate an alert to the appropriate party, most commonly the first trading partner, so that a corrected document may be issued. For example, a business may not permit invoices under one dollar to be processed. If an invoice with an amount due less than one dollar is submitted, the Business Rules Component 140 would generate the alert to the party issuing the invoice that the invoice does not comply with the business rule. The invoice would not be processed further, until corrected. The alert may be in the form of e-mail, IM, text, voice message or the alert may be sent via any convenient method of transmission. Preferably, the customized intermediate format file which does not comply with a business rule is not processed further until the non-compliance is resolved.

Continuing to refer to FIG. 1, the EDI Transformation Component 130 may also apply math rules and logic rules to the intermediate format file. One or more Math Components 150 may facilitate calculations via the Graphical User Interface 120. One or more Logical Components 160 may assist users in performing real-time decision making via the Graphical User Interface 120. The EDI Transformation Component 130 may also add syntax and semantics as appropriate from the applicable EDI standard to the intermediate format file.

The Main Translator 110 and the EDI Transformation Component 130 (with the Business Rules Component 140, the Math Components 150, and the Logical Components 160) preferably perform complete verification to ensure that the intermediate format file is compliant with both the appropriate EDI standard, and with any business rules stipulated by the first trading partner.

The Main Translator 110 and the EDI Transformation Component 130 (with the Business Rules Component 130, the Math Components 150, and the Logical Components 160) communicate with users through the Graphical User Interface 140.

Preferably, there is at least one input device 165 and at least one output device 175 in communication with the Graphical User Interface 120. The input device 165 and the output device 175 may work with and/or be part of the computer system storing the EDI communication facilitation device 100. In addition, one or more input devices 165 and one or more output devices 175 may be part of a separate computer system in communication with the computer system housing the EDI communication facilitation device 100. For example, the separate computer system having input devices 165 and/or output devices 175 might be a client computer system of a second trading partner or a computer system of an intermediary. In one or more embodiments of the present disclosure, the Main Translator 110 and the EDI Transformation Component 130 (with the Business Rules Component 130, the Math Components 150, and the Logical Components 160) may be located in memory on a server. The server may be in communication with one or a plurality of individual computers, which may be located at facilities of one or more trading partners.

Referring again to FIG. 1, the customized intermediate format file having been verified, is then sent to a Mini-Translator 180, which translates the customized intermediate format file into a secondary format. The secondary format is compatible with the computer system of the second trading partner. The secondary partner may have any number of trading partners which may be in the position of the "first trading partner," that is, the originators of documents. In such a case, the EDI formats of these "first trading partners" may vary considerably. If the second trading partner has twenty such "first trading partners," the Mini-Translator 180 of the present disclosure does not need to be capable of translating from twenty different EDI "first" formats into the secondary format, because EDI documentation from all of the twenty trading partners would first be translated by the Main Translator 110 and the EDI Transformation Component 130 into twenty customized intermediate format files. Accordingly, the Mini-Translator 180 only has to be able to translate from the intermediate format to the secondary format. The Mini-Translator 180 of the instant disclosure is preferably customized for the second trading partner.

Referring again to FIG. 1, by using the Mini-Translator 180, the second trading partner may download an interactive, translated, customized file in the secondary format ("secondary format file") as a Smart Web Form 190 onto a client computer. The Smart Web Form 190 may be made available ("sent") to the second trading partner in any convenient fashion, for example, via cloud computing, via a web-based server, via e-mail, or via an instant messaging system. The client computer may be a computer, smart phone, smart pad, or any other suitable device.

Using the Smart Web Form 190, the second trading partner may view and may interact with the secondary format file. Interaction may include creating responsive documentation (not pictured in FIG. 1). Other responsive actions may also be taken, such as allowing shipments, issuing payments, depositing a payment, or other such activity. The secondary format file includes all the business rules of the first trading partner (as added by the EDI Transformation Component 130). Thus, as the responsive documentation is created using the Smart Web Form 190, the Smart Web Form 190 verifies the responsive documentation. For example, use of the Smart Web Form 190 to create responsive documentation may provide substantial verification, in a typical case 80% or more, that the responsive documentation complies with the appropriate EDI standards and/or the business rules of the first trading partner. If the responsive documentation fails verification, an alert may be sent to the second trading partner so that a correction may be made.

The responsive documentation created using the Smart Web Form 190 may have a plurality of second fields, at least one of which has responsive data. The responsive documentation is sent to the Main Translator 110. The Main Translator 110 maps the second fields in the responsive documentation to the standard fields of the EDI standard. The responsive data is then translated into the first EDI format of the first trading partner. If the verification process through use of the Smart Web Form 190 was less than 100% complete, the Main Translator 110 also completes the verification process. For example, if the Smart Web Form 190 verifies 80% of the responsive documentation, the Main Translator 110 will verify the remaining 20%. If the responsive documentation fails verification, an alert may be sent to the second trading partner so that a correction may be made. The translated and verified responsive documentation is sent to the first trading partner.

Figure 2:
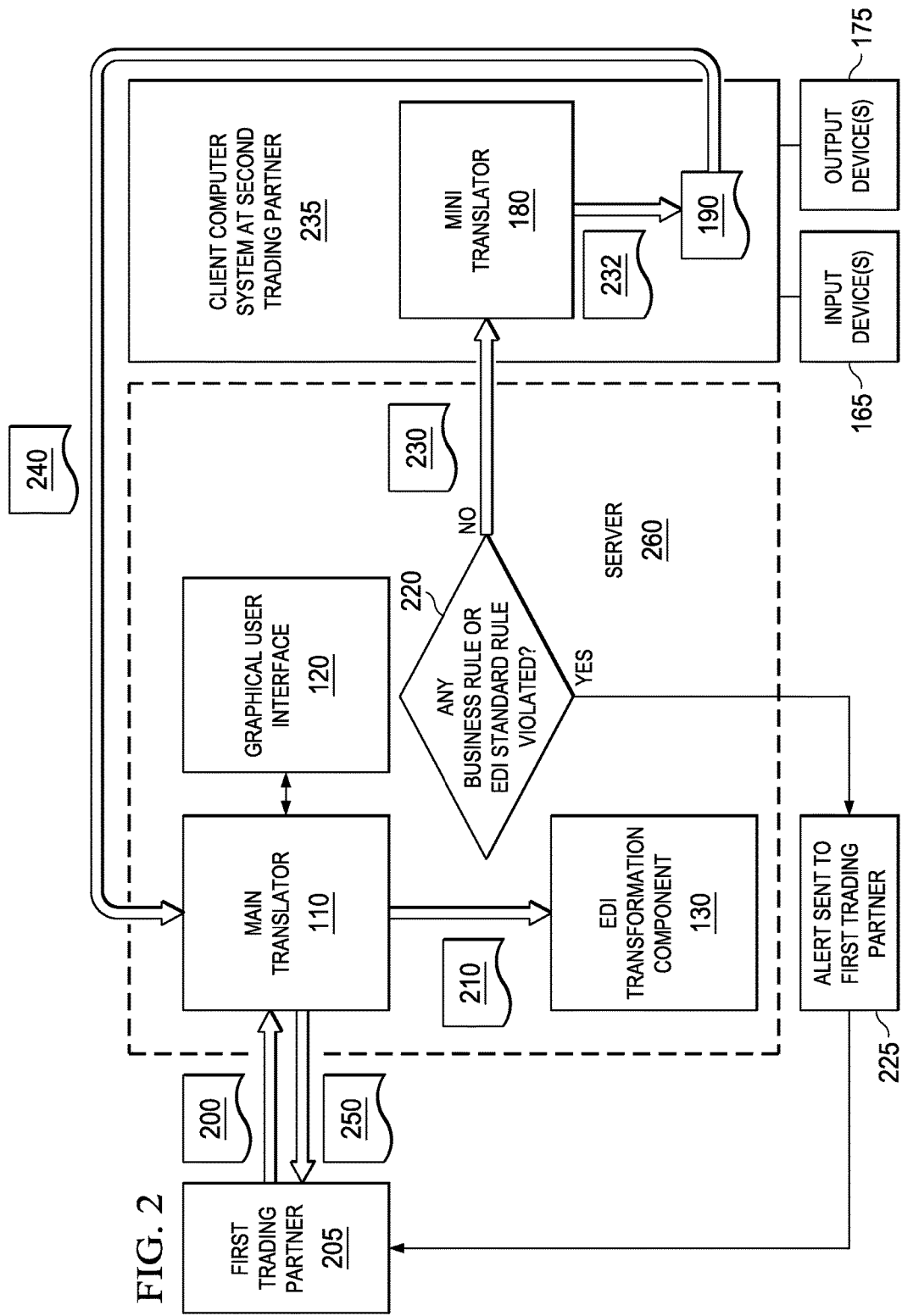
FIG. 2 depicts use of an EDI facilitation device in a process of facilitating an EDI communication, in accordance with one or more embodiments of the present disclosure.

FIG. 2 depicts a process of facilitating an EDI communication, in accordance with one or more embodiments of the present disclosure. An input file 200, in a first trading partner's EDI format, is sent from the first trading partner 205 to the Main Translator 110. The GUI 120 facilitates user input via the Main Translator 110, correlates information in the input file to an EDI X12 standard, and then re-formats the input file 200 from the first trading partner's EDI format to an intermediate format, to create an intermediate format output file 210. The re-formatting may be accomplished by adding tags.

Continuing to refer to FIG. 2, the intermediate format output file 210 is sent to an EDI Transformation Component 130. The EDI Transformation Component 130 applies functionality, such as math, logic, and business rules, customized for the first trading partner to the intermediate format output file 210 to create a customized intermediate format output file 230. The EDI Transformation Component 130 also checks the intermediate format output file 210 to determine whether any of the business rules 220 are violated.

If any of the business rules are violated 220 by the intermediate format output file 210, an alert 225 may be sent to the first trading party 205. If no rules are violated, the now-customized intermediate format output file 230 is sent to the Mini-Translator 180. The Mini-Translator 180 translates the customized intermediate format output file 230 into a secondary format, compatible with systems of the second trading partner, to create a secondary format file 232.

Continuing to refer to FIG. 2, using the Mini-Translator 180, the second trading partner may download the secondary format file 232 as a Smart Web Form 190 to a client computer 235. (Alternatively, the Smart Web Form 190 may be made available to the second trading partner in some other fashion. For example, the Smart Web Form 190 may be made available via cloud computing, via a web-based server, via e-mail or as a text message.) Using the Smart Web Form 190, the second trading partner may view and interact with the secondary format file 232 and create responsive documentation 240 in the secondary format by completing portions of the secondary format file 232, or by creating one or more new documents. Because the secondary format file 232 includes all the business rules of the first trading partner (as added by the EDI Transformation Component 130), use of the Smart Web Form 190 ensures compliance with the business rules of the first trading partner as the responsive documentation 240 is created. The Smart Web Form 190 may provide complete or partial verification that the responsive documentation 240 is consistent with appropriate EDI standards, as well as business rules of the first trading partner.). If the responsive documentation 240 fails verification, an alert may be sent to the second trading partner so that a correction may be made.

Referring again to FIG. 2, the responsive documentation 240 in the second format is sent to the Main Translator 110, which completes the verification process (if not completed earlier). The Main Translator 110 translates the responsive documentation 240 into an EDI standard format such as X12, and then into the first EDI format of the first trading partner 205, to create a responsive documentation in the first EDI format 250. The responsive documentation in the first EDI format 250 is then sent (or otherwise made available) to the first trading partner 205.

In the embodiment depicted in FIG. 2, the Main Translator 110 and EDI Transformation component 130 are within a server 260, whereas the Mini-Translator 180 is located on the client computer system 235, which may be within the facilities of the second trading partner.

Figure 3:
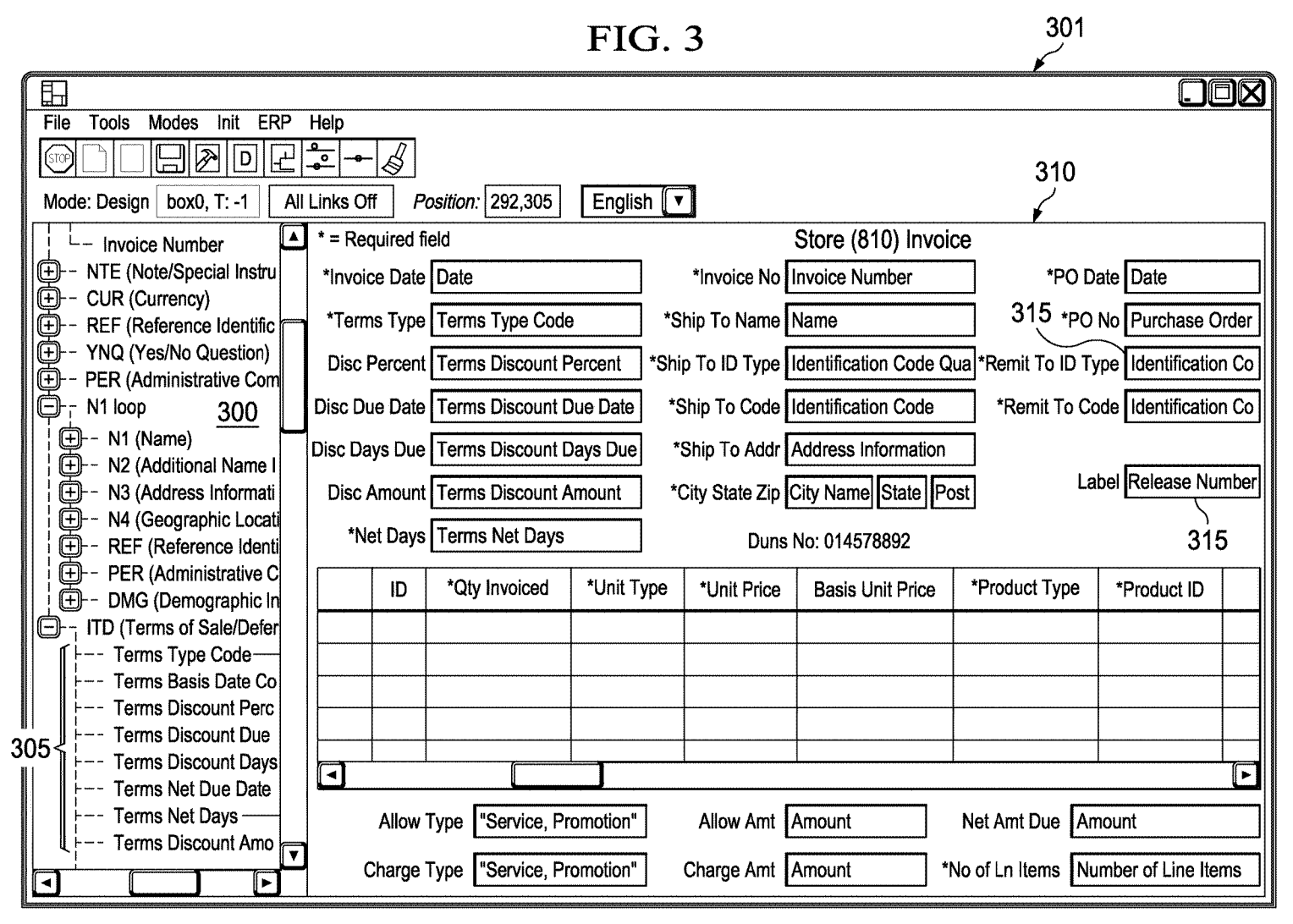

FIG. 3 illustrates a screen shot 301 of a Graphical User Interface 120 of an EDI facilitation device, in accordance with one or more embodiments of the present disclosure, depicting a first trading partner's invoice 310, which is an example of an EDI document. A scrollable column 300 on the left of screen (as seen from a user's viewpoint) contains preferably a complete list of EDI X12 standard fields 305. The center of the screen depicts the trading partner's invoice 310, having one or more invoice fields 315, which may be particular to the trading partner. Illustrated in FIG. 3 are a plurality of invoice fields 315, which include "Invoice Date," "Terms Type," "Disc [discount] Percent," "Invoice Number," and "Ship To," among many others. FIG. 3 sets the stage for a process in accordance with one or more embodiments of the present disclosure wherein the EDI X12 standard fields 305 are connected to the invoice fields 315, using a drag and drop functionality.

Figure 4:
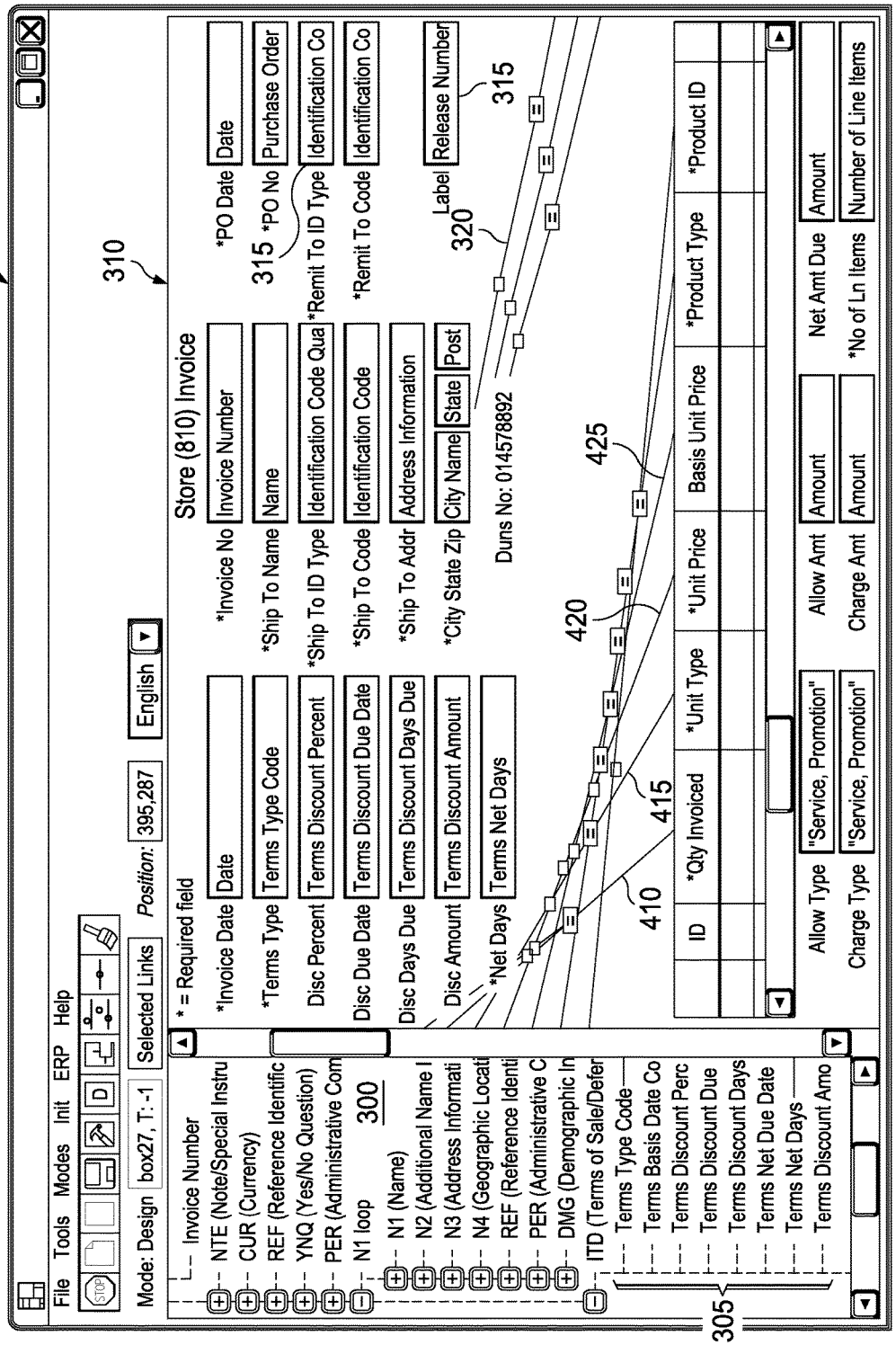
FIG. 4 illustrates a screen shot of the Graphical User Interface of FIG. 3, wherein a process of mapping the invoice fields to the EDI X12 standard fields has begun, in accordance with one or more embodiments of the present disclosure.

FIG. 4 illustrates a second screen shot 401 of the Graphical User Interface 120 of FIG. 3 depicting a first phase of a process wherein the first trading partner's invoice of FIG. 3 is converted to an intermediate format, like Gold Standard™ by DiCentral®, in accordance with one or more embodiments of the present disclosure. The drag and drop functionality of the Graphical User Interface 120 facilitates mapping (shown by lines 320) of one or more of the invoice fields 315 from the trading partner's invoice 310, to the EDI X12 standard fields 305 in the scrollable column 300 on the left of screen, as part of the conversion process. One can use the drag and drop functionality by clicking on an entry in the EDI X12 standard fields 305 in the scrollable column 300, holding down a cursor and dragging a pointer of the cursor to a matching entry in the invoice fields 315 from the trading partner's invoice 310.

For example, in FIG. 4, line 410, created by the drag and drop functionality of the present disclosure, connects "Quantity Invoiced" of the EDI X12 standard fields 305 to "Qty Invoiced" of the invoice fields 315. Line 415 connects "Unit or Basis for Meas [Measurement]" of the EDI X12 standard fields 305 to "Unit Type" of the invoice fields 315. Note that the language used in the EDI X12 standard fields 305 is usually similar to (but may or may not be exactly the same as) the items in the invoice fields 315 to which they are matched. Line 420 connects "Unit Price" of the EDI X12 standard fields 305 to "Unit P[rice]" of the invoice fields 315. Line 425 connects "Basis of Unit Price Co[de] . . . " of the EDI X12 standard fields 305 to "Basis Unit" of the invoice fields 315. The lines mentioned above are exemplary, as other lines 320 are also shown in FIG. 4.

Figure 5:
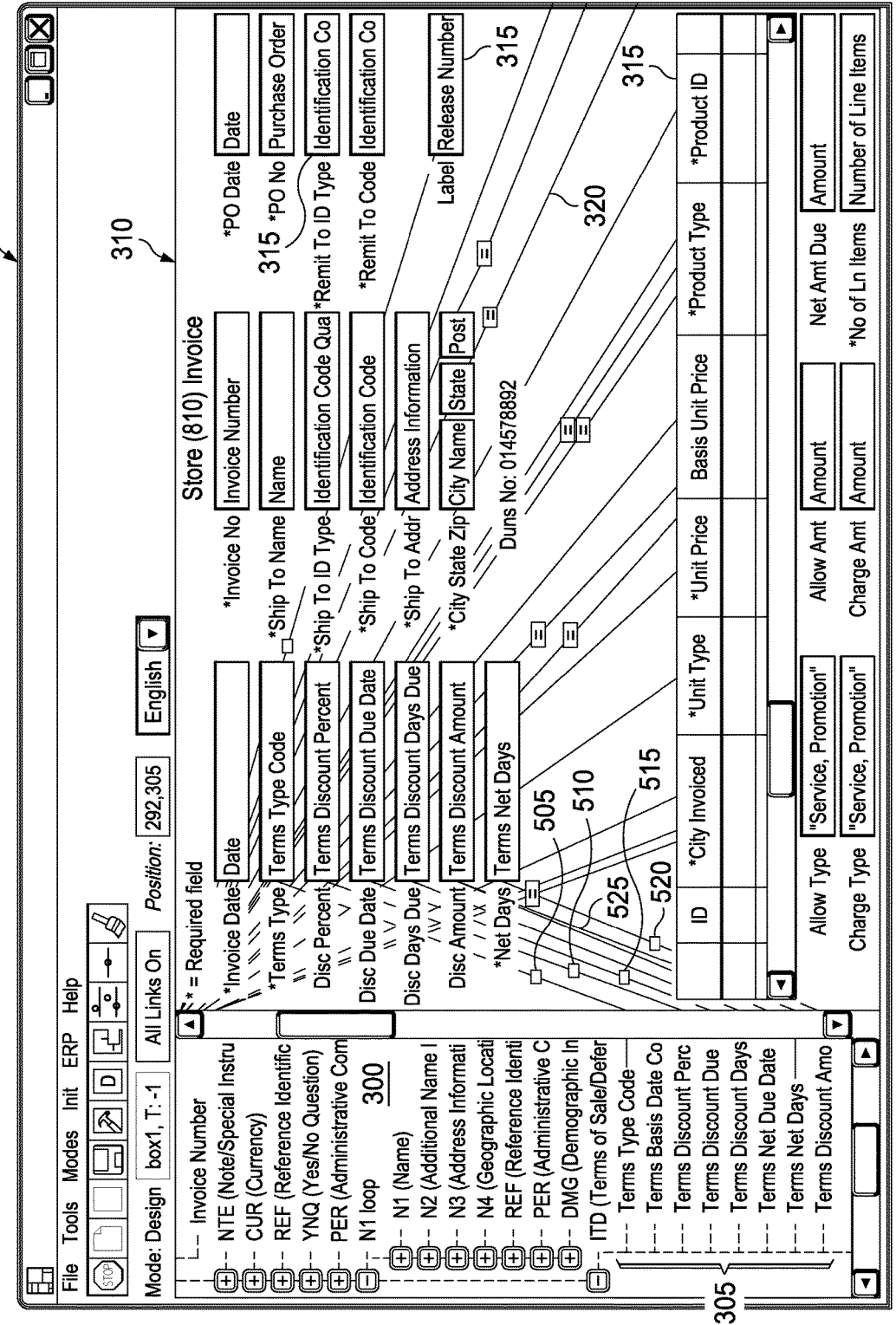
FIG. 5 illustrates a screen shot of a Graphical User Interface of FIG. 3 and FIG. 4, wherein the process of mapping the invoice fields to the EDI X12 standard fields has progressed further than in FIG. 4, in accordance with one or more embodiments of the present disclosure.

FIG. 5 illustrates a screen shot 501 of a Graphical User Interface 120 depicting a second phase of a process, wherein the fields from the trading partner's invoice are converted to an intermediate format, in accordance with one or more embodiments of the present disclosure. FIG. 5 is similar to FIG. 4, but with additional mapping having been accomplished. More invoice fields 315 from the trading partner's invoice 310 are shown in FIG. 5 as having been mapped (shown by lines 320) to the EDI standard fields 305 in the scrollable column 300. For example, line 505 connects "Terms Type Code" of the EDI X12 standard fields 305 to "Terms Type Code" of the invoice fields 315. Line 510 connects "Terms Discount Percent" of the EDI X12 standard fields 305 to "Terms Discount Percent" of the invoice fields 315. Line 515 connects "Terms Discount Due Date" of the EDI X12 standard fields 305 to "Terms Discount Due Date"

of the invoice fields 315. Line 520 connects "Terms Net Days" of the EDI X12 standard fields 305 to "Terms Net Days" of the invoice fields 315. Line 525 connects "Terms Discount Amount" of the EDI X12 standard fields 305 to "Terms Discount Amount" of the invoice fields 315.

FIG. 6 illustrates a screen shot 601 of a Smart Web Form 190, such as DIFiller Interface™ by DICentral®, in accordance with one or more embodiments of the present disclosure. A first trading partner's invoice has been converted to a secondary format file, compatible with the second trading partner system, and has been downloaded to the second trading partner for viewing and/or interaction. The second trading partner may complete the Smart Web Form 190 by adding information to the fields, such as an "Invoice Date" field 610. Taking the left hand column as an example, the second trading partner would add appropriate information to the following fields: "Invoice Date" 610, "Terms Type" 615, "Disc [discount] Percentage" 620, "Disc Due Date" 625, Disc Days Due" 630, "Disc Amount" 635 and "Net Days" 640. The fields in the middle and right hand columns would also be completed.

FIG. 7 illustrates a screen shot 701 of a Graphical User Interface of an EDI facilitation device, depicting the use of a Logical Component 160, in accordance with one or more embodiments of the present disclosure. Specifically, FIG. 7 depicts application of a business rule 710 defined as "If B1 is equivalent to ("=") S1, then A1," but otherwise ("else") null. A document that did not comply with this business rule 710 would not be processed further and an alert would be generated.

FIG. 8 illustrates a screen shot 801 of a Graphical User Interface of an EDI facilitation device, depicting the use of a Mathematical Component 150, in accordance with one or more embodiments of the present disclosure. The Mathematical Component 150 specifies that "option 3 " 810 has been selected, thus there is no round up for a particular formula 820 (the formula in this case being a calculation of a number in column 1 times a second number in column 3 minus a third number in column 10).

Figure 9:
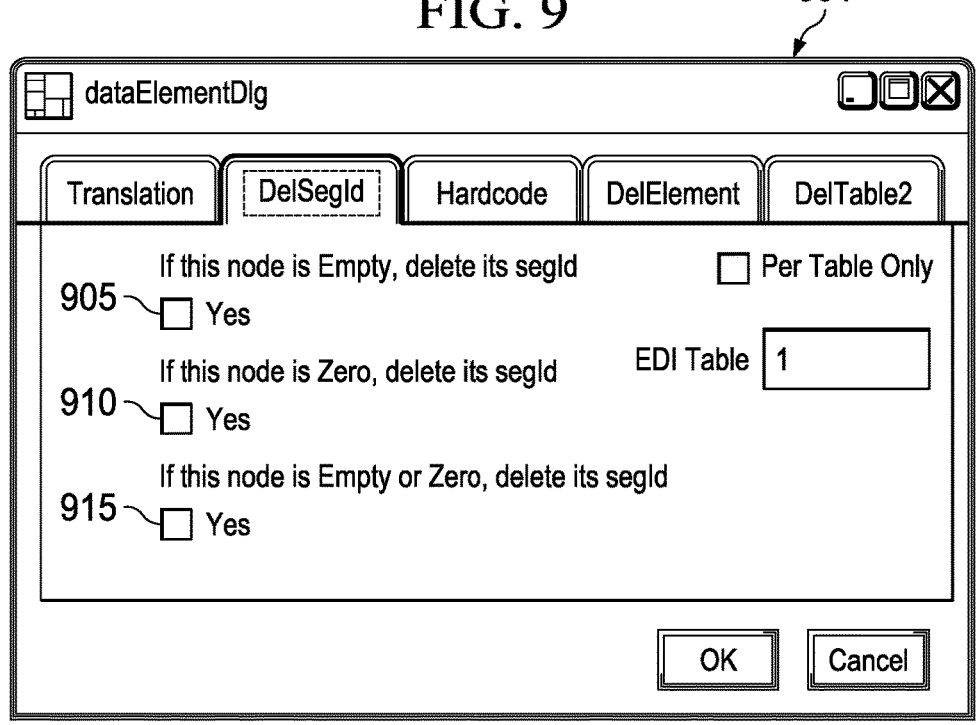
FIG. 9 illustrates a screen shot of a Graphical User Interface of an EDI facilitation device depicting the use of a business rule, in accordance with one or more embodiments of the present disclosure.

FIG. 9 illustrates a screen shot 901 of a Graphical User Interface of an EDI facilitation device, depicting an example for the use of a Business Rule 130, in accordance with one or more embodiments of the present disclosure. In the Graphical User Interface of FIG. 9, a business could designate not to send (or receive) an invoice if it is for $0 and/or if the amount of the invoice is not entered. For example, if a "Yes" box 905 below the statement "If this node is Empty, delete its segld [segment load]" is checked, an invoice will not be forwarded without an amount listed. Alternatively, if a second "Yes" box 910 below the statement "If this node is Zero, delete its segld" is checked, an invoice will not be forwarded if it has a zero dollar amount. In another alternative, if a third "Yes" box 915 below the statement "If this node is Empty or Zero, delete its segld" is checked, an invoice will not be forwarded if it does not show an amount or if it has a zero dollar amount. If none of the "Yes" boxes or checked, the invoice will be forwarded even if it is for $0 or the amount is not filled in.

Figure 10A:
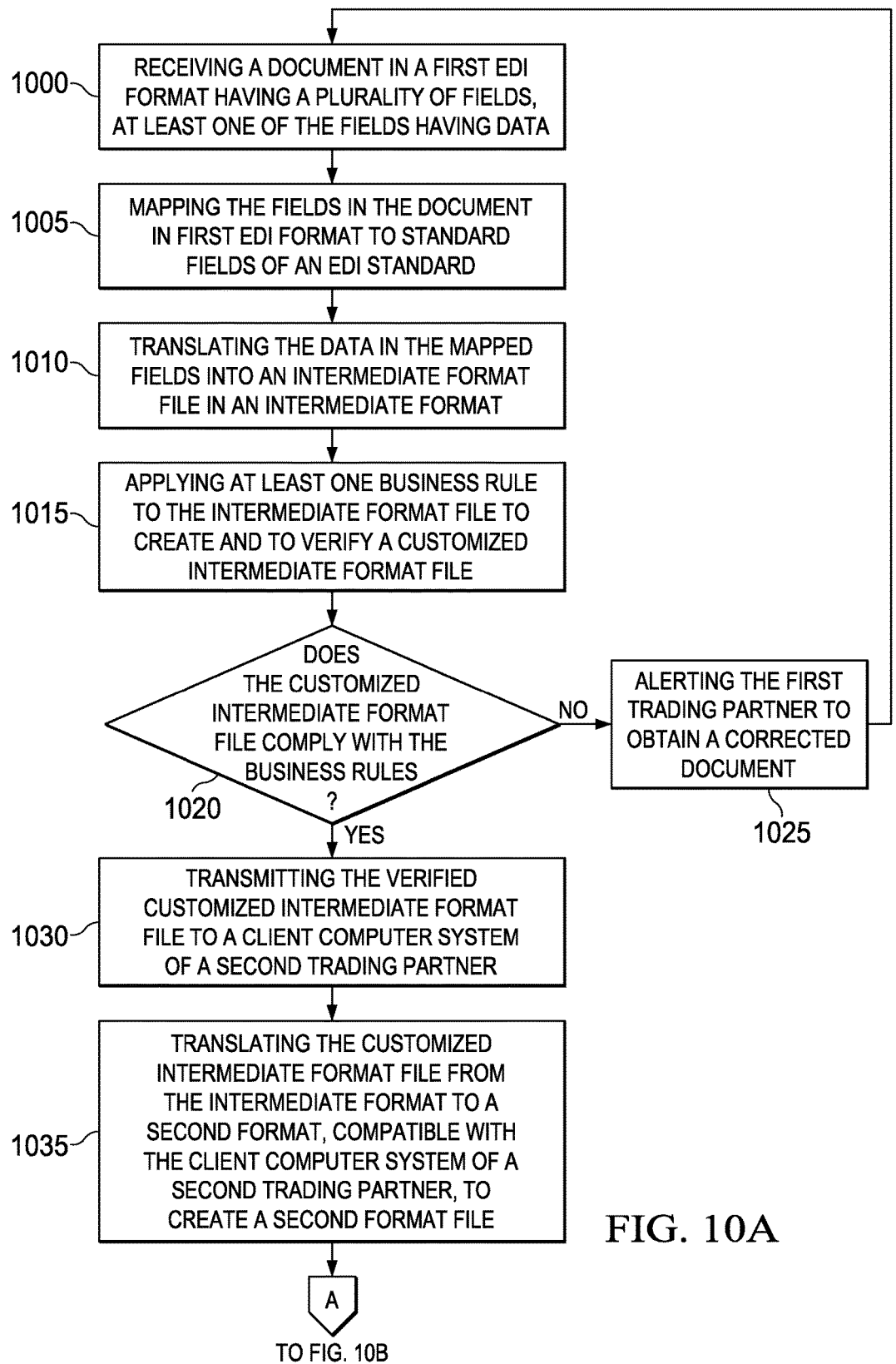
FIGS. 10A and 10B depict a flowchart of a process of EDI communication, with FIG. 10A depicting a first portion of the flowchart and FIG. 10B depicting a second portion of the flowchart, in accordance with one or more embodiments of the present disclosure.
Figure 10B:
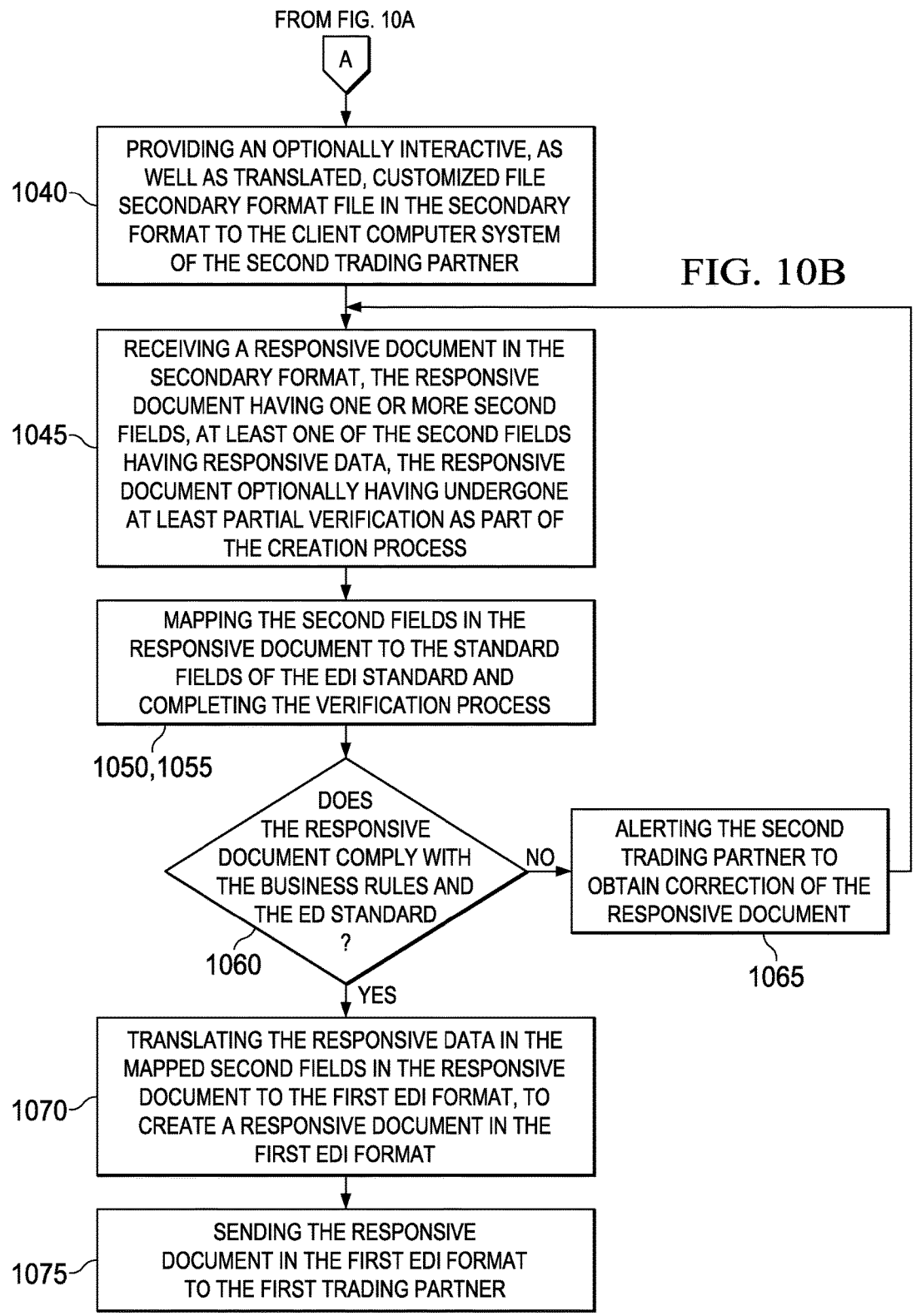

FIGS. 10A and 10B depict a flowchart of one or more embodiments of the present disclosure. Receiving 1000 a document in a first EDI format having a plurality of fields, at least one of the fields having data, the fields in the document in first EDI format are mapped 1005 to standard fields of an EDI standard. The data in the mapped fields are translated 1010 into an intermediate format file in an intermediate format. At least one business rule is applied 1015 to the intermediate format file to create and verify a customized intermediate format file. Math rules and logic rules may also be applied to the intermediate format file. During verification, it is determined whether 1020 the customized intermediate format file complies with the business rules. If the customized intermediate format file does not comply with the business rule, the first trading partner is alerted 1025, so that a corrected document may be obtained.

Continuing to refer to FIGS. 10A and 10B, if the customized intermediate format file does comply with the business rule, the verified, customized intermediate format file may be transmitted 1030 to a client's computer system of a second trading partner. (Alternatively, one or more additional steps may be taken at the server level.) Once the customized intermediate format file is verified, the customized intermediate format file is translated 1035 from the intermediate format to a second format, which is compatible with the client computer system of a second trading partner, creating a second format file.

The second format file is preferably provided 1040 to the second trading partner in an interactive format, such as a Smart Web Form. This allows the second trading partner to prepare a responsive document in the second format. The Smart Web Form may provide at least partial verification of compliance with the business rules as the responsive document is being prepared. The responsive document is received 1045 in the secondary format with the responsive document having one or more second fields and at least one of the second fields having responsive data. The second fields in the responsive document are mapped 1050 to the standard fields of the EDI standard. Additional verification may be performed 1055, to determine whether 1060 the responsive document complies with the business rules and with the EDI standard. The determination 1060 may be performed as part of the process of creating or completing the responsive document or may be done after the responsive document is created.

Continuing to refer to FIG. 10B, if the responsive data does not comply with the business rules and/or the EDI standard, the second trading partner is alerted 1065 so that a corrected responsive document may be obtained. If the responsive data complies with the business rules and the EDI standard, the responsive data in the mapped second fields in the responsive document are translated 1070 to the first EDI format to create a responsive document in the first EDI format. The responsive document in the first EDI format is sent 1075 to the first trading partner.

Figure 11:
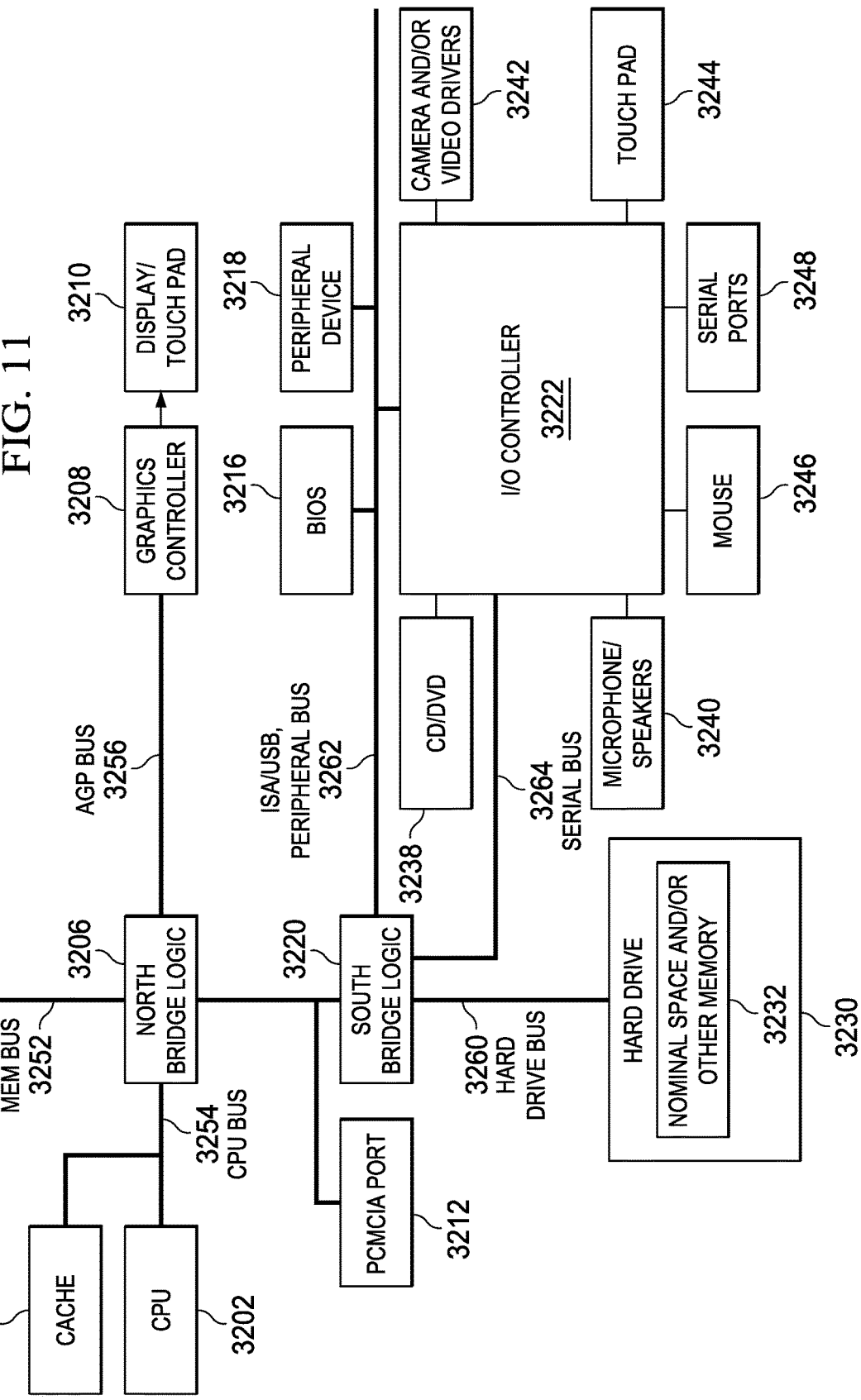
FIG. 11 is a diagram representing an architecture for an EDI facilitation device, in accordance with one of more embodiments of the present disclosure.

Turning now to FIG. 11, which represents an architecture in accordance with one or more embodiments of the present disclosure, is a machine 3200 that includes a main memory 3201 storing an electronic data interchange ("EDI") facilitation device 100, in accordance with one or more embodiments of the present disclosure, is illustrated. The machine 3200 may be configured in any number of ways, including as a laptop unit, a desktop unit, a network server, mobile device, telephone, net-book, or any other configuration. Machine 3200 generally includes a central processing unit (CPU) 3202 coupled to the main memory 3201, and to a variety of other peripheral computer system components through an integrated bridge logic device 3206. The bridge logic device 3206 is sometimes referred to as a "North bridge," for no other reason than it often is depicted at the upper end of a computer system drawing. The CPU 3202 couples to the North bridge logic 3206 via a CPU bus 3254, or the North bridge logic 3206 may be integrated into the CPU 3202. The CPU 3202 may comprise, for example, of a Pentium™ IV microprocessor. It should be understood, however, that the machine 3200 could include other alternative types of microprocessors. Further, an embodiment of the machine 3200 may include a multiple-CPU architecture, with each processor coupled to the North bridge logic unit 3206. An external cache memory unit 3204 may further couple to the CPU bus 3254 or directly to the CPU 3202.

The main memory 3201 couples to the North bridge logic unit 3206 through a memory bus 3252. The main memory 3201 functions as the working memory for the CPU 3202 and generally includes a conventional memory device or array of memory devices in which program instructions and data are stored. The main memory 3201 may comprise any suitable type of memory such as dynamic random access memory (DRAM), or any of the other various types of DRAM devices, such as synchronous DRAM (SDRAM), extended data output DRAM (EDO DRAM), or Rambus™ DRAM (RDRAM). The North bridge 3206 couples the CPU 3202 and main memory 3201 to the peripheral devices in the system through a Peripheral Component Interconnect (PCI) bus 3258 or other expansion bus, such as an Extended Industry Standard Architecture (EISA) bus. The present disclosure, however, is not limited to any particular type of expansion bus, and thus various buses may be used, including a high speed (66 MHz or faster) PCI bus. Various peripheral devices that implement the PCI protocol may reside on the PCI bus 3258 as well.

Referring again to FIG. 11, the EDI facilitation device 100 stored in the main memory 3201 preferably includes both components depicted in FIG. 1 and functions as in the description herein of that figure. A mini translator 180 may be a part of the EDI facilitation device 100 within the machine 3200, or may be part of a separate computer system (not depicted in FIG. 11) and in communication with the components of the EDI facilitation device 100. If the mini translator 180 is part of a separate computer system, the separate computer system may include one or more input 165 and output devices 175.

The machine 3200 includes a graphics controller 3208 that couples to the North bridge logic 3206 via an expansion bus 3256. As shown in FIG. 11, the expansion bus 3256 comprises an Advanced Graphics Port (AGP) bus. Alternatively, the graphics controller 3208 may couple to North bridge logic 3206 through the PCI bus 3258. The graphics controller 3208 may embody a typical graphics accelerator generally known in the art to render three-dimensional data structures on display 3210. North bridge logic 3206 includes a PCI interface to permit master cycles to be transmitted and received by North bridge logic 3206. The North bridge logic 3206 also includes an interface for initiating and receiving cycles to and from components on the AGP bus 3256. The display 3210 comprises any suitable electronic display device upon which an image or text can be represented. A suitable display device may include, for example, a cathode ray tube (CRT), a liquid crystal display (LCD), a thin film transistor (TFT), a virtual retinal display (VRD), a touch pad, or any other type of suitable display device.

The machine 3200 may comprise a computer system and may also optionally include a Personal Computer Memory Card International Association (PCMCIA) drive 3212 coupled to the PCI bus 3238. The PCMCIA drive 3212 is accessible from the outside of the machine and accepts one or more expansion cards that are housed in special PCMCIA cards, enclosures which are approximately the size of credit cards but slightly thicker. Accordingly, PCMCIA ports are particularly useful in laptop computer systems, in which space is at a premium. A PCMCIA card typically includes one connector that attaches to the PCMCIA port 3212, and additional connectors may be included for attaching cables or other devices to the card outside of the machine 3200. Accordingly, various types of PCMCIA cards are available, including modem cards, network interface cards, bus controller cards, and memory expansion cards. If other secondary expansion buses are provided in the computer system, another bridge logic device 3220 typically couples the PCI bus 3258 to that expansion bus. This bridge logic is sometimes referred to as a "South bridge," reflecting its location vis-a-vis the North bridge in a typical computer system drawing.

In FIG. 11, the South bridge 3220 couples the PCI bus 3258 to an Industry Standard Architecture (ISA) bus 3262 and to a hard drive bus 3260. The hard drive bus 3260 typically interfaces input and output devices such as a CD ROM drive and/or Digital Video Disc (DVD) drive 3238, a hard disk drive 3230, microphone and/or speaker divers 3240, camera and/or video drivers 3242, a touch pad driver 3244, and/or a mouse driver 3246, in accordance with the embodiment of the disclosure shown in FIG. 11. The hard drive bus 3260 shown in FIG. 11 couples to the hard drive 3230, which has nominal space 3232 and may have other memory.

In FIG. 11, various ISA-compatible devices are depicted as coupled to the ISA bus 3262, including a BIOS ROM 3216. The BIOS ROM 3216 is a memory device that stores commands ("BIOS instructions"), which instructs the computer how to perform basic functions such as sending video data to the display or accessing data on CDs, DVDs, or hard floppy disk drives. In addition, the BIOS ROM 3216 may be used to store power management instructions for hardware-based (or "legacy") power management systems or to store register definitions for software-based power management systems. The BIOS instructions also enable the computer to load the operating system software program into main memory during system initialization and transfer control to the operating system so that the operating system can start executing. This is also known as the INT19 "boot" sequence. The BIOS ROM 3216 typically is a "nonvolatile" memory device, which means that the memory contents remain intact even when the machine 3200 powers down. By contrast, the contents of the main memory 3201 typically are "volatile" and thus are lost when the computer shuts down. The South bridge 3220 of FIG. 11 supports an input/output controller 3222 that operatively couples to basic input/output devices such as a keyboard 3247, a mouse 3246, a CD/DVD drive 3258, general purpose parallel and serial ports 3248, and various input switches such as a power switch and a sleep switch (not shown). The I/O controller 3222 typically couples to the South bridge via a standard bus, shown as the ISA bus 3262 in FIG. 11. A serial bus 3264 may provide an additional connection between the I/O controller 3222 and South bridge 3220. The I/O controller 3222 typically includes an ISA bus interface (not specifically shown) to transmit and receive registers (not specifically shown) for exchanging data with the South bridge 3220 over the serial bus 3264.

In light of the principles and example embodiments described and illustrated herein, it will be recognized that the example embodiments can be modified in arrangement and detail without departing from such principles. Also, the foregoing discussion has focused on particular embodiments, but other configurations are also contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments. As a rule, any embodiment referenced herein is freely combinable with any one or more of the other embodiments referenced herein, and numbers of features of different embodiments are combinable with one another, unless indicated otherwise.

Similarly, although example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, and processes in which the individual operations disclosed herein are combined, subdivided, rearranged, or otherwise altered.

This disclosure may include descriptions of various benefits and advantages that may be provided by various embodiments. One, some, all, or different benefits or advantages may be provided by different embodiments.

In view of the wide variety of useful permutations that may be readily derived from the example embodiments described herein, this detailed description is intended to be illustrative only, and should not be taken as limiting the scope of the invention. What is claimed as the invention, therefore, are all implementations that come within the scope of the following claims, and all equivalents to such implementations.

What is claimed is:

1. A computer-implemented method for facilitating electronic data interchange ("EDI"), comprising:
   receiving, at an intermediate computer system, an EDI document in a first format having data in a plurality of fields from a first computer system of a first trading partner;
   facilitating mapping of the fields of the EDI document to a plurality of EDI standard fields of an EDI standard, the mapping facilitated by one or more processors of the intermediate computer system;
   translating the data in the mapped fields to create data in an intermediate format;
   translating the data from the intermediate format to a second format compatible with a second computer system of a second trading partner, to create a second format file;
   processing the second format file at the intermediate computer system to generate a smart web form; and
   sending, via a communication network communicatively coupling the intermediate computer system and the second computer system, the generated smart web form to the second computer system,
   permitting the second trading partner to view and interact with the second format file using the smart web form, comprising:
      creating responsive documentation using the smart web form, the responsive documentation responsive to the EDI document,
      wherein the smart web form verifies that the responsive documentation complies with EDI standards and business rules of the first trading partner as the responsive documentation is created.

2. The method of claim 1, wherein the first trading partner is a buyer and the second trading partner is a seller.

3. The method of claim 1, wherein the EDI document contains business information, transportation information, medical information, scientific information, or engineering information.

4. The method of claim 1, wherein the EDI standard is the American National Standards Institute ("ANSI") Accredited Standards Committee ("ASC") X12 standard.

5. The method of claim 1, wherein the mapping facilitated by the one or more processors comprises the one or more processors receiving information provided via a drop and drag functionality of a graphical user interface ("GUI").

6. The method of claim 1, further comprising adding at least one tag to the data while translating the data in the mapped fields to an intermediate format.

7. The method of claim 1, further comprising applying at least one rules component to the data in the intermediate format.

8. The method of claim 7, wherein the at least one rules component includes a business rules component, which includes at least one business requirement of the first trading partner.

9. The method of claim 7, wherein the at least one rules component includes a logical rules component or a mathematical rules component.

10. The method of claim 7, wherein the intermediate format is a universal EDI format.

11. The method of claim 8, further comprising determining whether the data in the intermediate format meets the at least one business requirement of the first trading partner.

12. The method of claim 11, wherein if the business requirement is violated, an alert is sent to the first computer system of the first trading partner.

13. The method of claim 1, further comprising:
   receiving the responsive documentation in the second format, via the communication network, from the second computer system, the responsive documentation having a plurality of second fields, at least one second field containing responsive data.

14. The method of claim 13, further comprising mapping the plurality of second fields in the responsive documentation to fields of the EDI standard.

15. The method of claim 14, further comprising translating the responsive documentation to the first format.

16. The method of claim 15, further comprising sending the responsive documentation in the first format to the first computer system.

17. An article of manufacture comprising a non-transitory computer readable storage medium storing instructions to configure a processor-based system to:
   receive, from a first computer system associated with a first trading partner, an electronic data interchange ("EDI") document in a first format, the EDI document having data in a plurality of fields;
   facilitate mapping of the fields of the EDI document to a plurality of standard fields of an EDI standard;
   translate the data in the mapped fields to create data in an intermediate format;
   translate the data from the intermediate format to a second format compatible with a second computer system of a second trading partner, to create a second format file;
   process the second format file to generate a smart web form; and
   send, via a communication network communicatively coupling the processor-based system and the second computer system, the generated smart web form to the second computer system,
   permit the second trading partner to view and interact with the second format file using the smart web form to:
      create responsive documentation using the smart web form, the responsive documentation responsive to the EDI document, wherein the smart web form verifies that the responsive documentation complies with EDI standards and business rules of the first trading partner as the responsive documentation is created.

18. The article of manufacture of claim 17, wherein the EDI document contains business information, transportation information, medical information, scientific information, or engineering information.

19. The article of manufacture of claim 17, wherein the mapping of the fields from the EDI document to the plurality of standard fields of an EDI standard includes receiving information provided via a drop and drag functionality of a graphical user interface ("GUI").

20. The article of manufacture of claim 17, wherein the instructions to configure the processor-based system further comprise instructions to configure the processor-based system to add at least one tag to the data while translating the data in the mapped fields to an intermediate format.

21. The article of manufacture of claim 17, wherein the instructions to configure the processor-based system further comprise instructions to configure the processor-based system to:
apply at least one rules component to the data in the intermediate format.

22. The article of manufacture of claim 21, wherein the at least one rules component is selected from the group consisting of a business rules component, a logical rules component and a mathematical rules component.

23. The article of manufacture of claim 21, wherein the intermediate format is a universal EDI format and wherein the instructions to configure the processor-based system further comprise instructions to configure the processor-based system to verify that the data in the intermediate format meets the at least one rules component, the at least one rules component comprising at least one business requirement of the first trading partner.

24. The article of manufacture of claim 17, wherein the instructions to configure the processor-based system further comprise instructions to configure the processor-based system to:
receive the responsive documentation in the second format, via the communication network, from the second computer system, the responsive documentation having a plurality of second fields, at least one second field containing responsive data;
map the plurality of second fields in the responsive documentation to fields of the EDI standard;
translate the responsive documentation to the first format; and
send the responsive documentation in the first format to the first computer system.

25. An apparatus, comprising:
a processor communicatively coupled to at least one bus, at least one network communication interface, an input device, and at least one memory, the processor configured to receive, via the at least one network communication interface, an electronic data interchange ("EDI") document in a first format from a first computer system, the EDI document having a plurality of fields;
a graphical user interface ("GUI") component having a drag and drop functionality configured to allow a user interacting with the input device to map a plurality of fields of the EDI document in the first format to standard fields of an EDI standard using the drag and drop functionality;

a main translator component configured to receive input from the GUI component, the main translator component being further configured to translate data in the mapped fields of the EDI document to an intermediate format to create an intermediate file, wherein translating the data in the mapped fields comprises using information provided via the GUI component, and wherein the translating of the data occurs after the EDI document is received from the first computer system; and
an EDI mini-translator engine configured to translate the intermediate file to a secondary format to create a second format file, create a smart web form using the second format file as input, make the smart web form accessible to a second computer system of a second trading partner, permit the second trading partner to view and interact with the second format file using the smart web form to:
create responsive documentation using the smart web form, the responsive documentation responsive to the EDI document, wherein the smart web form verifies that the responsive documentation complies with EDI standards and business rules of a first trading partner as the responsive documentation is created.

26. The apparatus of claim 25, further comprising:
an EDI transformation component configured to interface with the main translator component and append at least one rules component to the intermediate file.

27. The apparatus of claim 26, wherein the at least one rules component is a business rules component and the EDI transformation component is further configured to initiate transmission of an alert to the first computer system if the business rules component is violated.

28. The apparatus of claim 26, wherein the at least one rules component is selected from the group consisting of a business rules component, a logical rules component and a mathematical rules component.

29. The apparatus of claim 25, wherein EDI main translator is further configured to:
receive a responsive documentation in the second format, the responsive documentation having a plurality of second fields, at least one second field containing responsive data;
map the plurality of second fields in the responsive documentation to fields of the EDI standard;
translate the responsive documentation to the first format; and
initiate transmission of the responsive documentation in the first format to the first computer system.

30. A computing system configured to facilitate electronic data interchange ("EDI") communication between at least two remote computer systems, the computing system comprising:
a processor communicatively coupled to at least one network communication interface, an input device, a memory, and a bus, the processor configured to receive, via the at least one network communication interface, an EDI document in a first format from a first computer system;
a graphical user interface ("GUI") component having a drag and drop functionality configured to allow a user, acting through the input device, to map a plurality of fields of the EDI document in the first format to standard fields of an EDI standard using the drag and drop functionality;

a main translator component configured to receive input from the GUI component, the main translator component being further configured to translate data in the mapped fields of the EDI document to an intermediate format to create an intermediate file, wherein translating the data in the mapped fields comprises using information provided via the GUI component, and wherein the translating of the data occurs after the EDI document is received from the first computer system; and an EDI mini-translator engine configured to translate the intermediate file to a secondary format to create a second format file, create a smart web form using the second format file as input, make the smart web form accessible to a second computer system of a second trading partner, and permit the second trading partner to view and interact with the second format file using the smart web form to:

create responsive documentation using the smart web form, the responsive documentation responsive to the EDI document, wherein the smart web form verifies that the responsive documentation complies with EDI standards and business rules of a first trading partner as the responsive documentation is created.

31. The computing system of claim 30, wherein the main translator component is further configured to:

receive a responsive documentation in the second format, the responsive documentation having a plurality of second fields, at least one second field containing responsive data;

map the plurality of second fields in the responsive documentation to the standard fields of the EDI standard;

translate the responsive documentation to the first format; and initiate transmission of the responsive documentation in the first format to the first computer system.

32. The computing system of claim 30, further comprising:

an EDI transformation component configured to:
  interface with the main translator component;
  append at least a business rules component to the intermediate file;
  determine whether the intermediate file complies with the business rule; and
  initiate transmission of an alert to the first computer system if the intermediate file does not comply with the business rule.

33. The method of claim 1, wherein the smart web form is generated by the intermediate computer system after receiving the EDI document from the first computer system.

* * * * *